(No Model.) 2 Sheets—Sheet 1.

M. SCHIRK.
INDEX PLATE FOR GEAR CUTTING MACHINES.

No. 416,954. Patented Dec. 10, 1889.

WITNESSES:
Fred G. Dieterich
Edw. W. Byrn

INVENTOR
Michael Schirk.
BY Munn & Co
ATTORNEY (No Model.) 2 Sheets—Sheet 2.

M. SCHIRK.
INDEX PLATE FOR GEAR CUTTING MACHINES.

No. 416,954. Patented Dec. 10, 1889.

WITNESSES:
Fred G. Dieterich
Edw. H. Byrn

INVENTOR
Michael Schirk
BY
ATTORNEY

UNITED STATES PATENT OFFICE.

MICHAEL SCHIRK, OF PLATTSMOUTH, NEBRASKA.

INDEX-PLATE FOR GEAR-CUTTING MACHINES.

SPECIFICATION forming part of Letters Patent No. 416,954, dated December 10, 1889.

Application filed June 29, 1889. Serial No. 316,115. (No model.)

*To all whom it may concern:*

Be it known that I, MICHAEL SCHIRK, of Plattsmouth, in the county of Cass and State of Nebraska, have invented a new and useful Improvement in Indicators for Slotting or Gear-Cutting Machines, of which the following is a specification.

The object of my invention is to provide an indicator for slotting or gear-cutting machines which shall show accurately the number of equal subdivisions into which the periphery of a disk is to be divided in cutting a gear-wheel of any desired number of teeth.

To this end it consists in the peculiar construction and arrangement of parts of an indicator attachment designed to be applied to an ordinary gear-cutting machine without material alteration of or injury to the organization of the latter, as will be hereinafter fully described, and pointed out in the claims.

Figure 1:
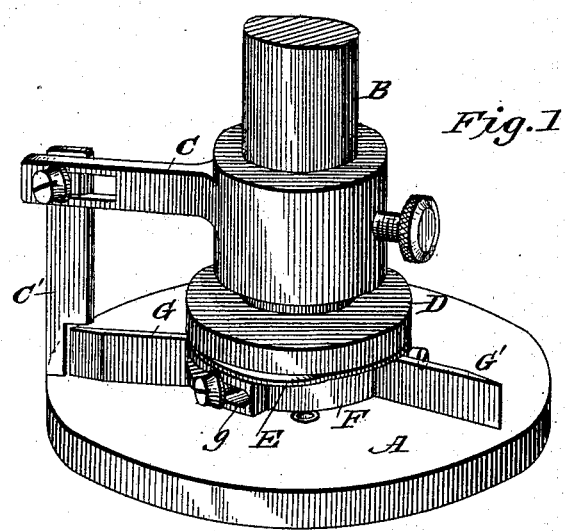
Figure 2:
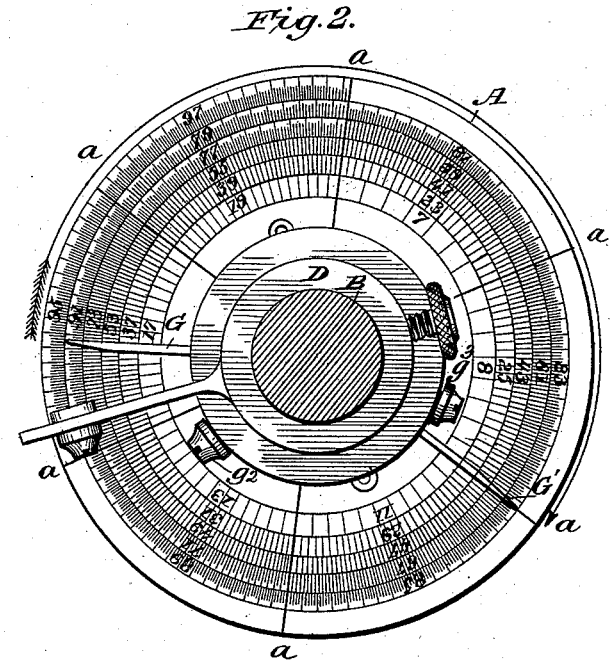
Figure 3:
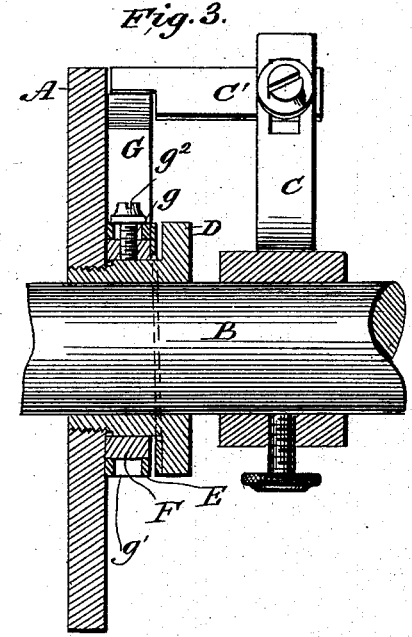
Figure 4:
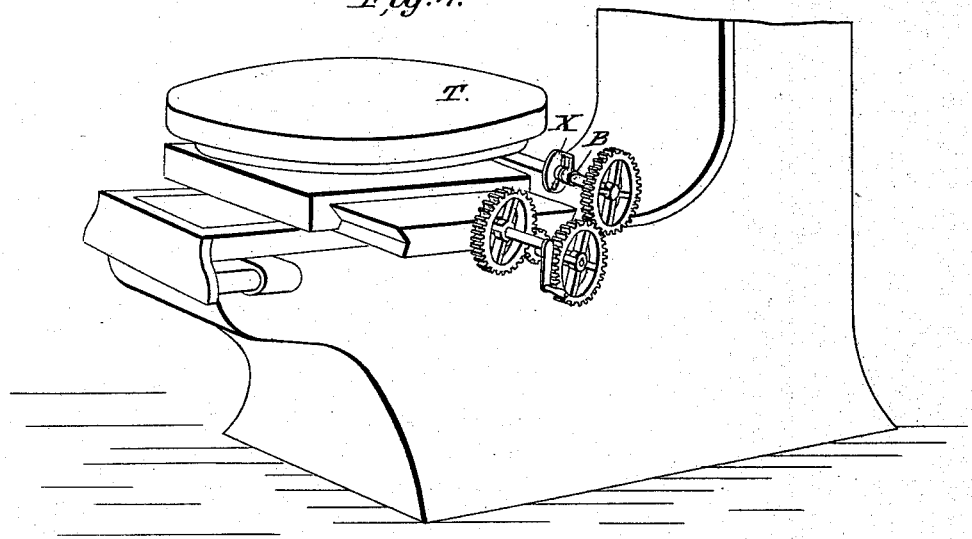
Figure 5:
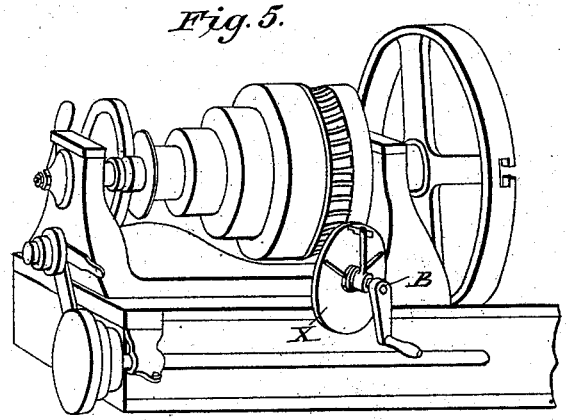

Figure 1 is a perspective view of the attachment with the graduations omitted. Fig. 2 is a face view of the indicator-plate with graduations marked thereon, the turning-shaft being in section. Fig. 3 is a section through the indicator longitudinal to the turning-shaft. Fig. 4 is a perspective view showing the attachment applied to a slotting-machine, and Fig. 5 is a perspective view showing the attachment applied to a lathe.

Referring to Fig. 4, T is the table, B the turning-shaft which rotates the table, and X shows the location of my indicator. This indicator is mounted upon the turning-shaft B, and when in action most of its parts remain stationary, while an index-hand or pointer on the turning-shaft rotates with the turning-shaft over the indicator-plate.

Referring to Figs. 1, 2, and 3, A is the indicator-plate, which is made in the form of a disk, and is provided with screw-holes or other means for rigidly connecting it to the stationary parts of the frame of the machine. Centrally through the disk passes the turning-shaft B. Surrounding this shaft and firmly attached to the disk by a screw-thread there is arranged a flanged hub D, in which the turning-shaft freely revolves. On the outer periphery of this hub there is adjustably carried a swiveling base-ring F, which is pressed into frictional contact with the indicator-plate by a spring-washer E, interposed between the flange of the hub and the base-ring. To the outer periphery of the base-ring there are adjustably secured two radial markers G and G', whose inner ends are bent to correspond to the periphery of the base-ring, and are seated thereon and connected thereto for an independent adjustment by slots $g$ and $g'$ in said bent portions and set-screws $g^2$ $g^3$, passing through said slots and tapped into the base-ring.

C is a radial arm provided with a sleeve embracing the turning-shaft B, and rigidly attached thereto by a set-screw. This arm at its outer end carries an adjustable pointer-blade C', extending to the plane of the indicator-plate. On the adjacent face of the indicator-plate are marked circular series of graduations, which serve to indicate the different number of teeth that a wheel may be provided with by my device. The graduations of the same length do not continue around the entire periphery of the plate; but the plate is divided into six aliquot parts, forming sectors of the circle, and the aliquot parts of one sector of a circle show spacings adapted for one size of tooth or number of teeth to a wheel, while the aliquot parts of the next sector of the same circle show aliquot parts adapted for another size of tooth or number of teeth to a wheel. In this way a large number of graduations can be placed upon a single indicator-plate and the latter adapted to a wide range of use. The radial lines $a$ indicate the subdivisions of these graduations into sectors of circles.

In order to illustrate the operation of my invention, it will be necessary to perform an example of subdivision of a wheel into a desired number of equal gear-teeth. The first factor in the case to be determined is the relation of the turning-shaft B to the turn-table T—*i. e.*, to know the number of revolutions of shaft B it is necessary to make in order to complete one revolution of the table T. We will assume that it takes one hundred and eighty revolutions of shaft B to rotate table T once. Now, suppose a wheel is to be cut into seventeen equal subdivisions, making seventeen teeth. (The odd number seventeen is taken, because it is not a multiple of one hundred and eighty, and it furnishes a good illustration of the application of my invention to such troublesome subdivisions.) Dividing one hundred and eighty by seventeen, we find that there will be ten and ten-seventeenths of a revolution of shaft B in order to make each tooth of a wheel of seventeen teeth. Now, the number of subdivisions in each sector (one-sixth of periphery of plate) being seventeen, six times this would show one hundred and two subdivisions of this size in a whole periphery, and ten-seventeenths of one hundred and two equals ten hundred and twenty seventeenths equals sixty. We know, therefore, that ten-seventeenths of a revolution is sixty-seventeenths of the whole circle (one hundred and two) of seventeenths. Then dividing sixty-seventeenths by seventeen, (the number of seventeenths in each sector,) to get the number of sectors representing ten-seventeenths of the whole circle, we find that this gives three sectors and nine-seventeenths of a sector, which is the excess of ten revolutions necessary to give the movement for one tooth; hence it is plain that in moving the table the distance necessary for one tooth in a wheel of seventeen teeth the shaft B is to be revolved ten times plus three sectors and nine-seventeenths of a sector. The markers G and G' are now adjusted on the plate so that they are three sectors and nine-seventeenths of a sector apart, as shown by the arrow in Fig. 2. The pointer C' is placed at the marker G, and the shaft B, with the pointer C', is revolved ten times, and on the last revolution is allowed to pass by the marker G and travel three sectors and nine-seventeenths of a sector farther, stopping at marker G', which measures on the revolving table the distance of one tooth. Before starting the gears to make the next tooth the two markers are, by means of the swiveling base-ring, pushed around together until the marker G again comes under the pointer, and the shaft B is then revolved, as before, ten revolutions three sectors and nine-seventeenths of a sector for the next tooth, and so on. Any other number of teeth may be formed on a wheel in the same manner.

To avoid the necessity of working out arithmetically the adjustment of the markers, a scale or chart showing the space to be left between the two markers for each different set of graduations on the indicator-plate is provided and in this way the work is facilitated and mistakes avoided.

In making use of my invention I may make the graduated plate larger and increase the number of circles and field sections. This plate may also be graduated on both sides.

In defining my invention with greater clearness I would state that I am aware that two markers have been adjustably arranged upon the face of an index-plate having a circular series of holes, which holes of any one circular series were spaced the same distance apart all around the circle, and which plate and markers were designed to operate in connecting with a revolving shaft and a counter for recording the number of revolutions—such as shown, for instance, in Patent No. 273,451—and I do not claim this arrangement. My invention is distinctive mainly in the construction of the index-plate A, which not only has a number of circles of different radii, but has also radial markings dividing the circumference of these circles into aliquot subdivisions, forming sectors of circles, and which sectors of the same circle have a different spacing or graduation of markings in the different sectors—i. e., a given circle of graduations, instead of preserving the same spacing throughout its entire circumference, has one set of spacings for one aliquot subdivision, another set of spacings for the next aliquot subdivision, and so on. This gives in compact form on a single plate an indefinite number of graduations, which are adapted to the cutting of wheels having an odd or any other number of teeth, thus supplying an important want in this class of machines.

Having thus described my invention, what I claim as new is—

The combination, with the two adjustable markers and the revolving shaft bearing an index-hand or pointer, of an indicator-plate having its face divided into a series of circles of different radii, and having these circles divided by radial lines into aliquot parts or sectors, and the sectors of any one circle graduated with different spacings from the other sectors of the same circle, substantially as shown and described.

MICHAEL SCHIRK.

Witnesses:
 THOM. WALLING,
 E. G. VANATTA,
 J. A. GUTSCHE.